(12) United States Patent
Champagne et al.

(10) Patent No.: US 7,771,515 B2
(45) Date of Patent: Aug. 10, 2010

(54) METHOD AND INSTALLATION FOR TREATING AN AQUEOUS EFFLUENT, IN ORDER TO EXTRACT AT LEAST ONE DISSOLVED GASEOUS COMPOUND; APPLICATION TO AQUACULTURE IN RECIRCULATED AQUEOUS MEDIUM

(75) Inventors: Jean-Yves Champagne, Lyons (FR); Robert Morel, Villeurbanne (FR); Francois Rene, Montpellier (FR); Gilles Lemarie, Montpellier (FR)

(73) Assignees: Institut National des Sciences Appliquees, Villeurbanne (FR); Institut Francais de Recherche Pour 'Exploitation de la Mer Ifremer, Issy les Moulineaux (FR)

( * ) Notice: Subject to any disclaimer, the term of this patent is extended or adjusted under 35 U.S.C. 154(b) by 520 days.

(21) Appl. No.: 11/812,623

(22) Filed: Jun. 20, 2007

(65) Prior Publication Data
US 2008/0011679 A1    Jan. 17, 2008

Related U.S. Application Data

(60) Provisional application No. 60/830,343, filed on Jul. 13, 2006.

(51) Int. Cl.
*B01D 19/00* (2006.01)
(52) U.S. Cl. .............. 95/242; 95/258; 95/260; 95/263; 96/176; 96/194
(58) Field of Classification Search ........... 95/263–266, 95/242, 258, 260; 96/176, 194
See application file for complete search history.

(56) References Cited

U.S. PATENT DOCUMENTS

| | | | | |
|---|---|---|---|---|
| 3,888,210 A | * | 6/1975 | Buss | 119/226 |
| 4,001,090 A | * | 1/1977 | Kalina | 435/243 |
| 4,385,909 A | * | 5/1983 | Starr | 95/266 |
| 4,972,801 A | * | 11/1990 | Hunt | 119/215 |

(Continued)

OTHER PUBLICATIONS

D.J. Reinemann & M.B. Timmons; Prediction of Oxygen Transfer and Total Dissolved Gas Pressure in Airlift Pumping; Acquacultural Engineering 8 (1989) 29-46.

(Continued)

*Primary Examiner*—Duane Smith
*Assistant Examiner*—Douglas J Theisen
(74) *Attorney, Agent, or Firm*—Oliff & Berridge, PLC

(57) ABSTRACT

A method for treating an aqueous effluent comprising at least one dissolved gaseous compound, by partially separating said compound from said effluent, in order to obtain a treated aqueous phase.

In the method, an upflow liquid column of the aqueous effluent is established by injecting and distributing into said column, at the bottom, a gas phase less rich in said compound than the aqueous effluent, for example air or oxygen, said gas phase being distributed in the column in the form of bubbles where the volume increases upward. A mixed liquid/gas stream is obtained at the top. The mixed liquid/gas stream is then separated into a liquid stream constituting the treated aqueous phase, and an offgas stream enriched with said gaseous compound, where the mixed liquid/gas stream is later separated under vacuum by establishing a gas headspace between the liquid stream and the gas stream, and by aspirating the latter.

14 Claims, 3 Drawing Sheets

U.S. PATENT DOCUMENTS

| | | | | |
|---|---|---|---|---|
| 5,961,831 | A * | 10/1999 | Lee et al. | 210/614 |
| 6,171,480 | B1 * | 1/2001 | Lee et al. | 210/85 |
| 6,722,314 | B1 * | 4/2004 | Crisinel et al. | 119/226 |
| 7,125,438 | B2 * | 10/2006 | Skoglund et al. | 95/263 |
| 2004/0050253 | A1 * | 3/2004 | Skoglund et al. | 95/266 |

OTHER PUBLICATIONS

J. Clay Loyless and Ronald F. Malone; Evaluation of air-lift pump capabilities for water delivery, aeration, and degasification for application to recirculating aquaculture systems; Aquacultural Engineering 18(1998) 117-133.

A. Richmond, S. Boussiba, A. Vonshak and R. Kopel; A new tubular reactor for mass production of microalgae outdoors; Journal of Applied Phycology 5:-327-332, 1993.

Claude E. Boyd and Craig S. Tucker; Pond aquaculture water quality management; pp. 354-373, published in 1998.

* cited by examiner

METHOD AND INSTALLATION FOR TREATING AN AQUEOUS EFFLUENT, IN ORDER TO EXTRACT AT LEAST ONE DISSOLVED GASEOUS COMPOUND; APPLICATION TO AQUACULTURE IN RECIRCULATED AQUEOUS MEDIUM

This nonprovisional application claims the benefit of U.S. Provisional Application No. 60/830,343, filed Jul. 13, 2006.

BACKGROUND OF THE INVENTION

In general, the invention relates to the treatment of an aqueous effluent, comprising one or more dissolved gaseous compounds, for example carbon dioxide and/or nitrogen, in order to separate therefrom all or part of said compounds, considered for example as pollutants, in order to obtain a treated aqueous phase, depleted of said gas compound(s), or in any case whereof the concentration of said compounds is thereby monitored or controlled, for example below or above a predefined threshold.

More particularly, but by way of example, the treatment considered by the present invention forms part of any method for culturing a living organism, for example aquaculture, in recirculated aqueous medium, according to which in general:
- a bath of the aqueous medium is provided, uncovered or not, broken down or not into elementary circuits in series or in parallel, in which the cultured living organism, for example fish, is immersed,
- an effluent stream, from which the aqueous effluent to be treated is obtained, is tapped off from the bath, to control the concentration of dissolved gaseous compounds in said aqueous effluent,
- a feed stream, obtained from the treated aqueous phase, that is, depleted of dissolved gaseous compounds, is supplied to or reinjected into the same bath.

In the context of the present invention, "living organism" means living organisms of the lower kingdom, such as microorganisms, algae, etc., and also living organisms of the higher kingdom, such as fish, molluscs or shellfish.

For the purposes of the description of the present invention, said invention is now introduced, clarified and commented on with reference to aquaculture in recirculated aqueous medium.

Under the conditions of aquaculture in recirculated aqueous medium, to promote the growth and health of the fish, it is known today that it is essential to control the dissolved gas concentration, that is, to maintain:
- dissolved oxygen below a certain threshold,
- the dissolved carbon dioxide and nitrogen.

To also deplete the aquaculture aqueous effluent of at least one dissolved gaseous compound, for example dissolved carbon dioxide, a column called a ventilated column is used, essentially consisting of a column filled with a packing consisting of discrete elements favoring a gas/liquid interface (or diopter) with a large developed surface area according to the cross section and height of the column. The offgas to be treated is introduced and distributed at the top of the column, above the packing, for example by sprinkling, while an elution or "stripping" gas phase, less rich in said gaseous compound (carbon dioxide) than the aqueous effluent, for example pressurized air, is introduced at the bottom of the column, for example into the packing. A liquid stream constituting the treated aqueous phase is extracted at the bottom of the column, and an offgas stream, enriched with said dissolved gaseous compound, is extracted at the top of the column.

In the context of the present invention, the expression "less rich in said gaseous compound" means, all other things remaining equal (including pressure), the concentration of said gaseous compound in the aqueous phase that would be in equilibrium with the concentration of said gaseous compound in the gas phase is lower than the effective concentration of said gaseous compound in the treated aqueous phase. Essentially, using a ventilated column is equivalent to circulating water through a gas phase, in this case air, roughly in the ratio of 10 volumes of air in countercurrent flow to one volume of treated water.

The implementation of these ventilated columns, which can be treated as air-cooled cooling towers, has many drawbacks.

Their dissolved gas extraction efficiency is limited. For carbon dioxide for example, it appears impossible to extract more than 25 to 30% of the dissolved carbon dioxide. This is due to the limited developed surface area of the gas/liquid interface, which is further decreased by the development of biofilms in the column packing, on the one hand, and by clogging and preferential paths for the water in the packing, on the other.

Any ventilated column also consumes a relatively large amount of energy, due to its operation, in particular because the aqueous effluent to be treated must be pumped to send it to the top of the column.

With regard to maintaining the temperature of the outgoing treated aqueous phase, compared with the incoming aqueous effluent, which may be important in an aquaculture method in recirculated aqueous medium, the implementation of a ventilated column inherently dissipates heat energy, making it necessary in certain cases to heat the treated aqueous phase at the outlet of the ventilated column.

Any ventilated column represents a chamber with a non-negligible volume, given the volume of air (circulating gas phase), which gives rise to a relatively bulky installation, possibly representing a non-negligible investment in material and infrastructure.

And, from the standpoint of biological safety, like the air-cooled cooling towers, the implementation of a ventilated column may generate aerosols liable to come into contact with the surrounding atmosphere, in view of the overpressure existing in the ventilated column.

It is an object of the present invention to remedy the above-mentioned drawbacks of ventilated columns.

DESCRIPTION OF THE PRIOR ART

To oxygenate an aqueous medium, including in aquaculture, air-lift systems are known, which assume various forms in practical application. In general, in an air-lift, any appropriate means, for example a vertical line at least partially immersed in a bath of aqueous medium, or a line placed outside the bath, is used to establish an upflow liquid column.

For this purpose, a pressurized gas phase is injected and distributed in the column, in practice at the bottom of the vertical line, the gas phase being distributed in the liquid column in the form of bubbles whereof the volume increases upward, whereby a mixed liquid/gas stream, more or less homogeneous, is obtained at the top of the vertical line, said stream for example being removed via the upper end of the vertical line.

An air-lift therefore appears to be a dynamic system, but without mechanical parts of the pump type, designed to lift a liquid over a certain height, by using more or less large bubbles, obtained by injecting and distributing a pressurized gas into a liquid confined in a vertical column.

Such systems are well known, and have been modeled by various authors; cf. D. J. Reinemann and M. B. Timmons, Aquacultural Engineering 8 (1989), 29-46.

In aquaculture, such systems are widely used for oxygenating the bath of aqueous medium, in which the fish are bred, in said bath itself, or outside it, for a recirculated aqueous medium, by injecting and distributing pressurized atmospheric air.

Every air-lift is capable, not only of oxygenating an aqueous effluent treated thereby, when the aqueous phase injected and distributed is air or oxygen, but also of stripping dissolved gaseous compounds, such as carbon dioxide, from said aqueous effluent, as various authors have established and investigated; cf. J Clay Loyless and R. F. Malone, Aquacultural Engineering 18 (1998) 117-133. In consequence, every air-lift has the capacity of eluting or "stripping" the dissolved gaseous compounds from an aqueous effluent containing them, provided that use is made of an appropriate air-lift gas phase, that is, less rich in said gaseous compound than the treated aqueous effluent.

According to the publication of A. Richmond, S. Boussiba, A. Vonshak and R. Kopel, in Journal of Applied Phycology 5-327-332, 1993 and its FIG. 1, a method for the aquaculture of microalgae in recirculated aqueous medium is described, whereby:

a bath of aqueous medium is provided, in which the microalgae are cultured, in practice contained in tube bundles arranged horizontally, with an inlet distributor, and an outlet manifold,
   an effluent stream, enriched or saturated with oxygen, constituting the treated effluent, is withdrawn from the bath via the outlet manifold,
   said effluent is treated using an air-lift, as described previously, operating under positive pressure. For this purpose, an upflow liquid column of the treated aqueous effluent is established, air is injected and distributed in said column, at the bottom, this gas phase being distributed in the column in the form of bubbles whereof the volume increases upward, whereby a mixed liquid/gas stream is obtained at the top,
   the mixed liquid/gas stream is separated in a separator/degasser into a liquid stream constituting the treated aqueous phase, which is enriched with carbon dioxide and returned to the inlet distributor of the bath, and an oxygen-enriched offgas stream.

Such a treatment method has a relatively limited dissolved gas extraction yield in practice.

Various documents have also described methods for treating an aqueous effluent or an aqueous medium, using an air-lift with atmospheric air injected under pressure:

C. E. Boyd and C. S. Tucker, in the work "Pond aquaculture water quality management" pages 354-373, published in 1998, describe the use of an air-lift in a bath of aquaculture aqueous medium, uncovered,
   document U.S. Pat. No. 4,972,801 describes the use of an air-lift in a water supply borehole or well of an aquaculture pond, for lifting the feed water to distribute it in the pond, on the one hand, and to oxygenate the feed water stream,
   documents U.S. Pat. No. 5,961,831 and U.S. Pat. No. 6,171,480 describe a complete aquaculture system comprising an air-lift for lifting an aqueous effluent, withdrawn at the outlet of the aquaculture bath, after its filtration, and before its biofiltration.

SUMMARY OF THE INVENTION

One subject of the present invention is the particular use of an air-lift for correcting the drawbacks of ventilated columns.

It is the object of the invention to improve the dissolved gas extraction yield of the air-lifts.

In general, the present invention relates to a method for treating an aqueous effluent comprising at least one dissolved gaseous compound, for example carbon dioxide, consisting in at least partially separating said compound from said effluent, in order to obtain a treated aqueous phase, depleted of said compound, a method according to which:

(a) an upflow liquid column of the aqueous effluent is established, by injecting and distributing into said column, at the bottom, a gas phase less rich in said compound than the aqueous effluent, for example air or oxygen, said gas phase being distributed in said column in the form of bubbles whereof the volume increases upward, whereby a mixed liquid/gas stream is obtained at the top, (b) the mixed liquid/gas stream is separated into a liquid stream constituting the treated aqueous phase, and an offgas stream enriched with said gaseous compound, characterized in that the mixed liquid/gas stream is separated under vacuum by establishing a gas headspace between the liquid stream and the gas stream, and by aspirating the latter.

The method according to the present invention operates in the opposite manner to the one described in the publication of A. Richmond et al, in that, thanks to the abovementioned vacuum, it serves to deplete the treated aqueous phase of carbon dioxide, while enriching it with dissolved oxygen.

And more particularly, but not exclusively, this method of treatment, degasification or degassing, forms part of a method for culturing a living organism, in recirculated aqueous medium, whereby:

a bath of the aqueous medium is provided, in which the living organism is cultivated,
   an effluent stream, from which the aqueous effluent is obtained, is tapped off from the bath,
   and the bath is supplied with a feed stream, obtained from the treated aqueous phase,
   the treated aqueous phase being obtained outside the bath of aqueous medium, by a degassing or degasification treatment as previously defined.

In the context of the present invention, with regard to the separation of the mixed liquid/gas stream, "vacuum" means any pressure lower than the value obtained by subtracting, for example in cm water, the height of the upflow liquid column from the atmospheric pressure, or hydraulic pressure of the aqueous effluent to be treated.

Preferably, the inventive method is implemented like a siphon, and for this purpose, the liquid stream separated from the offgas stream constitutes a downflow liquid column, obtained by overflow of the mixed liquid/gas stream above a high point. In such a case, for example, the downflow liquid column and the upflow liquid column are concentric to one another.

In comparison with degasification with a ventilated column, the treatment method according to the invention provides the following essential advantages:

its operation consumes little energy, because it is only necessary to compress the gas phase injected into the liquid column, and to pump the offgas stream, to place the separation of the mixed liquid/gas stream under vacuum, its operation dissipates little heat energy, because it can be implemented in a compact, tightly organized installation, for example, two concentric tubes placed one inside the other, as stated previously, the installation required for its operation remains relatively simple and compact, its operation remains safe from the biological standpoint, because confined, and mainly under vacuum, and the offgas stream, after compression, can be condensed to recover the energy of condensation of the gaseous compounds extracted.

The treatment method according to the invention lends itself well also to:

reoxygenation of the treated aqueous phase, by oxygen injection into the upflow column and/or the downflow column, ozonation of the treated aqueous phase, by ozone injection into the upflow column, and extraction of the solid particles from the offgas stream, when said stream is in the form of a foam.

BRIEF DESCRIPTION OF THE DRAWINGS

The present invention is now described with reference to the drawing appended hereto, in which.

DESCRIPTION OF THE PREFERRED EMBODIMENTS

Figure 1:
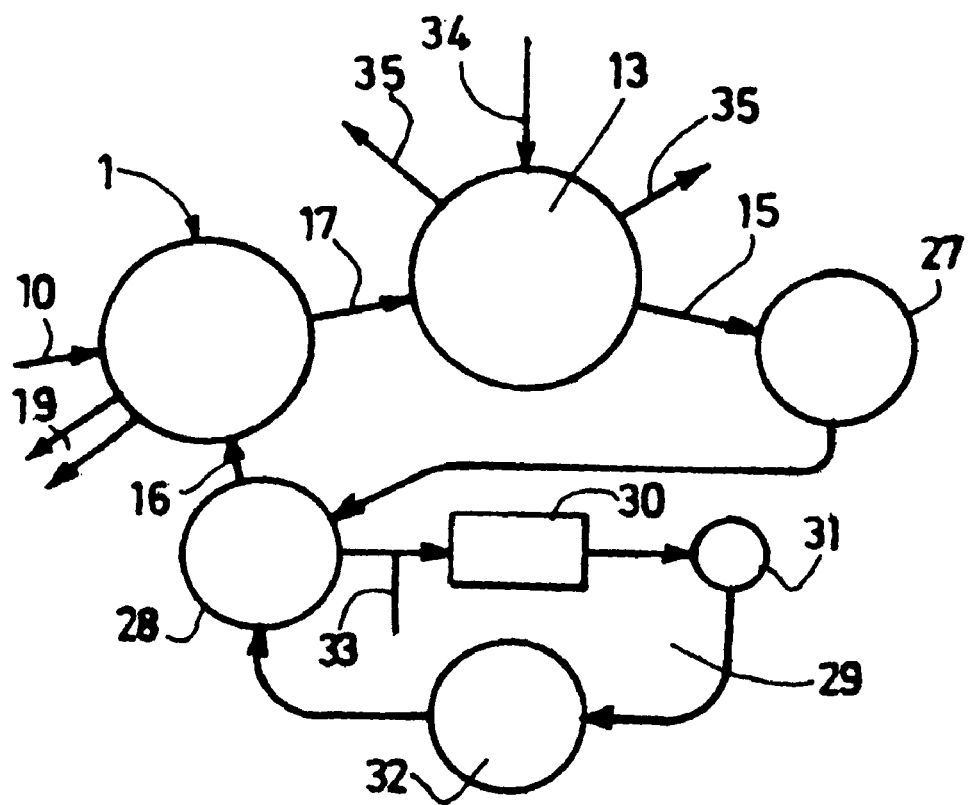
FIG. 1 schematically shows a complete aquaculture facility, in recirculated aqueous medium, incorporating an installation for treating the aqueous effluent resulting in particular from the metabolism and growth of higher living organisms, for example fish.

The aquaculture facility shown schematically in FIG. 1 is organized around a bath 13 of aqueous medium, in which the living organism of interest, for example fish, is cultured or bred; this bath 13 is, for example, contained in a pond 14. An effluent stream 15 is tapped off from the bath 13, mechanically filtered 27, and sent to a buffer tank 28. A recirculation loop 29 is established from the abovementioned buffer tank, for converting the nitrogen effluent, particularly ammonia, by the enzymatic or bacterial method, to nitrite and nitrate. For this purpose, a stream is withdrawn from the buffer tank 28, optionally supplemented 33 with fresh water, heated in a heat exchanger 30, sterilized 31 by UV radiation, then filtered using a bacterial bed 32, and finally returned to the tank 28. The aqueous effluent 16 to be treated according to the invention is obtained from the buffer tank 28.

The treatment installation according to the invention, that is, to extract or remove the dissolved gases 19, that is carbon dioxide and, to a certain extent, nitrogen, is shown schematically by reference numeral 1. It receives the aqueous effluent 16, and it generates a treated, that is degassed, aqueous phase, from which a feed stream 17 is reintroduced into the bath 13. As it passes through the treatment installation 1, the aqueous medium is depleted of dissolved gases, removed with the gas stream 19, by the elution or "stripping" action generated by injection of the gas phase 10, in this case air, into the medium, and in consequence poorer in carbon dioxide and/or nitrogen.

Part of the aqueous effluent 16 introduced into the treatment installation 1 may be obtained directly from the bath 13, that is, without passing through the bacterial filtration loop 29. And conventionally, considering the bath 13 as a closed medium, in addition to the feed stream 17 and the effluent stream 15, said bath receives nutrients 34 for the growth and development of the cultured living organisms, said organisms being regularly harvested or extracted from the pond 14, and a purge of nitrates 35 is regularly carried out.

Figure 2:
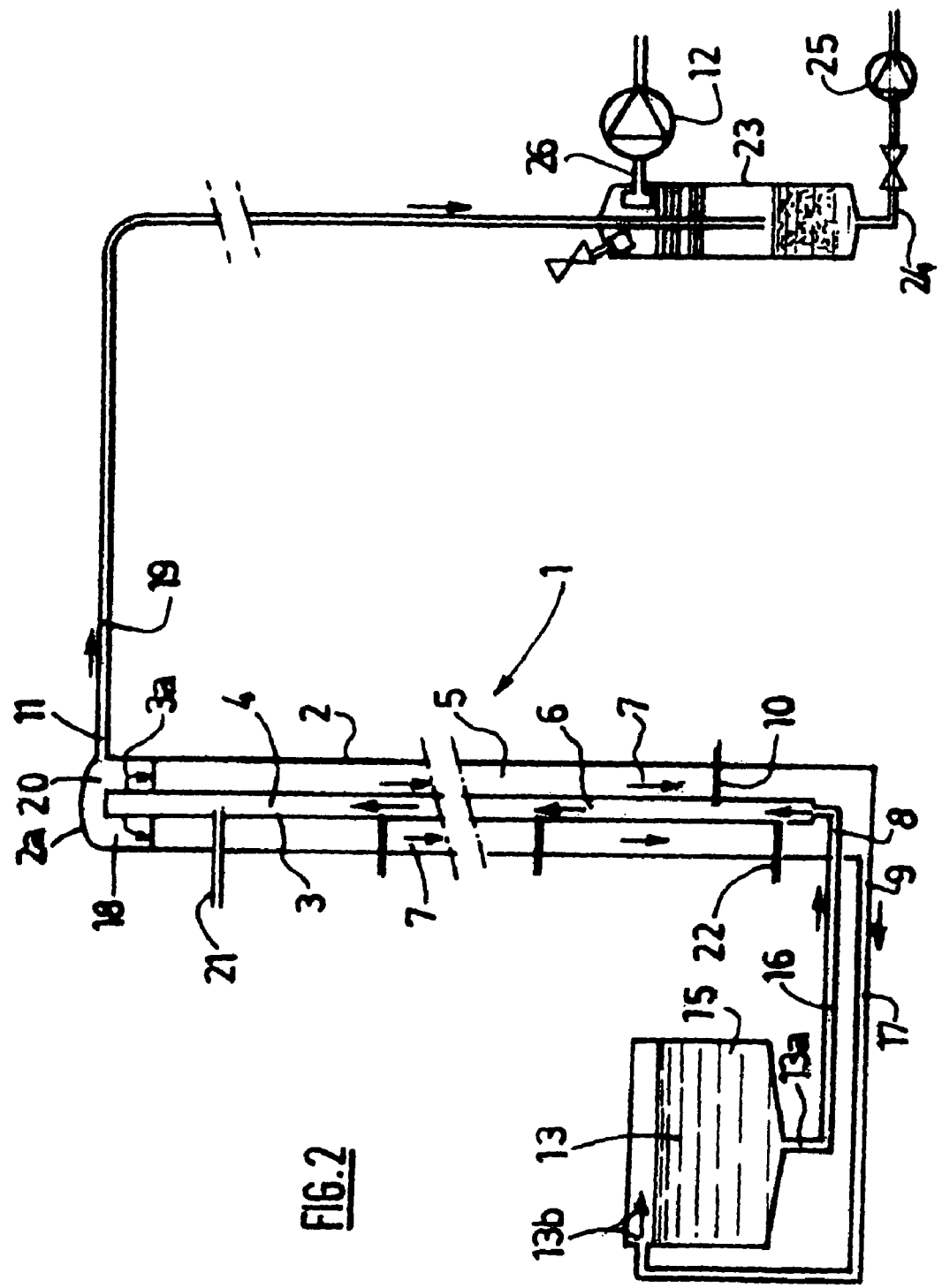
FIG. 2 shows, schematically and in particular, the installation for treating the aquaculture aqueous effluent.

The aqueous effluent treatment installation, shown in FIG. 2 in conjunction with the aquaculture bath 13, essentially comprises a column called a vacuum column, consisting of at least:

two concentric tubes, one external 2 and the other internal 3, positioned vertically, arranging an internal tubular chamber 4 for an upflow liquid column 6 or a downflow liquid column 7, and an external tubular chamber 5 for the downflow column 7 or the upflow column 6; the external tube 2 being closed 2a in its upper part, above the open upper end 3a of the internal tube 3, so that the external chamber 5 is closed and isolated from the exterior, means 8 for introducing the aqueous effluent 16 to be treated, positioned at the bottom of the internal chamber 4 or the external chamber 5; means 9 for removing the treated aqueous phase at the bottom of the external chamber 5 or the internal chamber 4, means 10 for injecting and distributing the gas phase, in this case pressurized air, in the upflow column 6, connected to a source of said pressurized gas phase, not shown, means 11 for removing the offgas stream, enriched with gaseous compound previously dissolved in the aqueous effluent, connected indirectly to an aspiration means 12 consisting of an air pump.

This installation makes it possible to treat the aqueous effluent 16, comprising the dissolved gaseous compound(s), in this case carbon dioxide, by separating said compounds at least partially from the effluent, to obtain the treated aqueous phase 17, depleted of these compounds.

With reference to FIG. 2:

a) an upflow liquid column 6 of aqueous effluent is established in the internal chamber 4, by injecting and distributing 10 into said column, at the bottom, a gas phase poorer in the abovementioned compounds than the aqueous effluent, in this case pressurized air or oxygen, whereby this gas phase is distributed in this column in the form of bubbles (not shown), whereof the volume increases upward, whereby a more or less homogeneous mixed liquid/gas stream 18 is obtained at the top, b) this mixed liquid/gas stream is separated into a liquid stream 17, constituting a downflow liquid column 7 in the external chamber 5, obtained by overflow of the abovementioned mixed stream 18 above the edge or high point 3a of the internal tube 3, and an offgas stream 19, enriched with said gaseous compound.

According to the invention, in the upper part of the external chamber 5, a gas headspace 20 is established between the liquid stream 17 and the gas stream 19, corresponding to the separation of the mixed liquid/gas stream 18; and this gas headspace is under vacuum, because of the aspiration of the gas stream 19 by the pump 12.

In consequence, the vacuum column previously described operates like a siphon, as shown in FIG. 2, whereby the downflow liquid column 7 and the upflow liquid column 6 are concentric to one another, the upflow liquid column 6 being internal, and the downflow liquid column 7 being external, or vice versa.

The installation shown in FIG. 2 also has the following features, which can be considered separately or in combination with one another.

The aqueous effluent 16 is introduced at the bottom of the upflow column 6 and the treated aqueous phase is tapped off at the bottom of the downflow column 7, substantially at the same level.

In addition to injected air, oxygen 21 is injected and distributed in the upflow column 6, at a high level, in any case higher than the gas phase introduction level 10. This oxygen injection serves, if necessary, to complete the oxygenation of the aquaculture aqueous medium.

If necessary, for example to sterilize the aqueous medium, decompose the humic acids, and restore the redox potential of the aqueous medium, ozone can be injected 22 and distributed in the downflow column 7, at a lower level than the gas phase introduction level 10.

If necessary, the cross section of the downflow liquid column 7 increases downward.

In general, the offgas stream is in the form of foam. In consequence, conventional foam removal means 23 are provided, to obtain a liquid exudate 24, possibly comprising a particulate fraction, for example of organic matter in suspension or in colloidal form, and an offgas 26 free of liquid phase and solid particles. The liquid exudate 24 is removed by a pump 25. The offgas 26 is pumped by the pump 12, whereof the suction is connected to the gas headspace 20 of the external tubular chamber 5.

As shown in FIG. 2:
an effluent stream 15, from which the aqueous effluent to be treated 16 is obtained, is tapped off from the aquaculture bath 13,
and said bath 13 is supplied with a feed stream 17, obtained from, or identical to the treated aqueous phase, the latter being obtained outside the bath 13 from the aqueous effluent 16, according to the treatment method carried out in the vacuum column 1.

The level of withdrawal 13a from the bath 13 is substantially the same as that of the bottom of the upflow liquid column 6. And the feed level 13b of the bath 13 is above the bottom of the downflow column 7.

Figure 3:
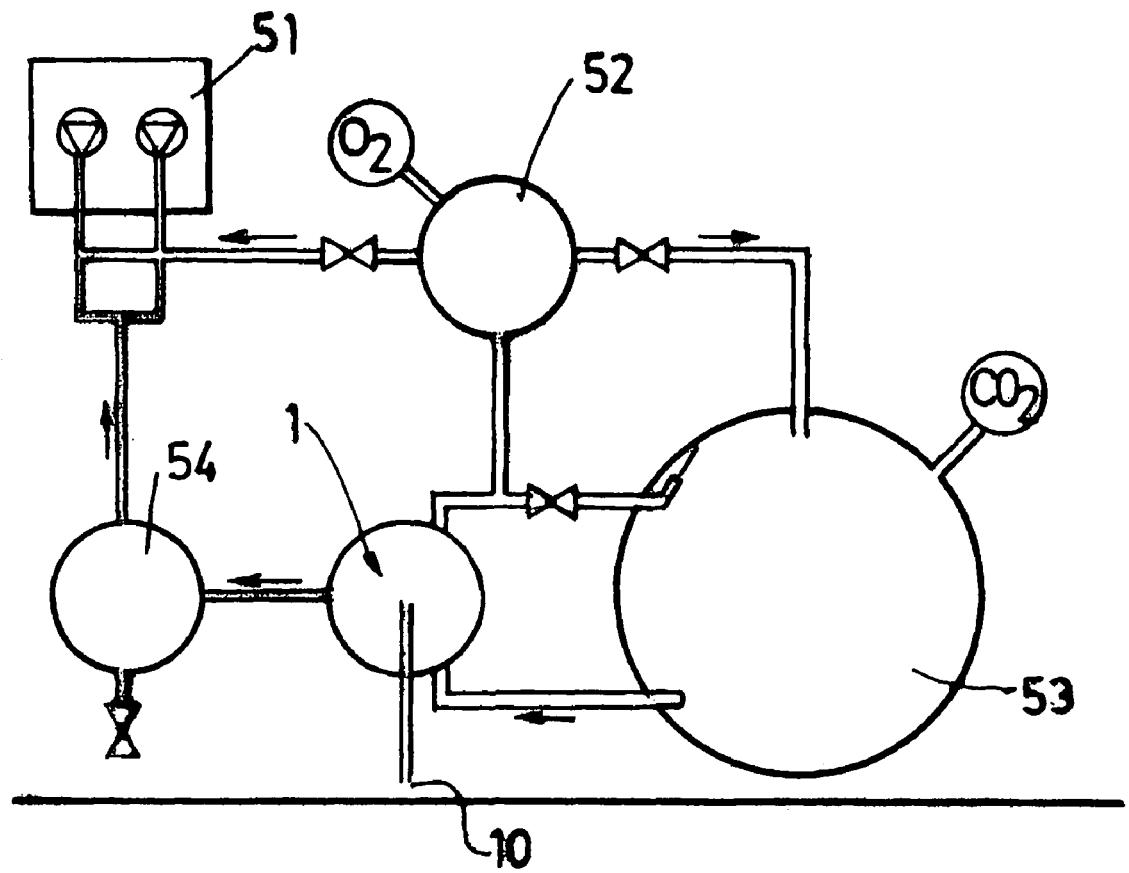
FIG. 3 shows an experimental rig used to test the present invention.

The present invention is now described experimentally with reference to the experimental rig shown in FIG. 3, and commented as follows:
51: vacuum pump
52: oxygenator
53: equivalent tank to the aquaculture bath 13
1: vacuum column
10: injected aqueous phase
54: buffer or recovery tank.

1. Experimental Rig 1.1 Vacuum Column 1

The vacuum column 1 consists of two concentric PVC tubes 2, 3 4.5 m high and 25 cm in diameter for the external tube 2 and 4 m high and 16 cm in diameter for the internal tube 13 forming a U tube. The principle of this column consists in injecting 10 air into the internal tube in order to entrain a water stream 6 by air-lift, and then creating a vacuum by aspiration of said air at the top 20 of the column using a vacuum pump 12. While the air 19 is aspirated at the top of the column, the water entrained by the air-lift descends 7 into the external tube 3. To obtain a system maintained in stable dynamic conditions, aspiration created is slightly greater than the injection.

The surplus water aspirated is trapped in a buffer tank 34 before the pump 12 in order to protect it. This water is loaded with fine particles which have been entrained to the top of the column by air-lift. Hence the system serves to observe the quality of the water recovered. The surface area developed by the microbubbles of injected air is about 9 $m^2 \cdot L^{-1}$. The column operates with a 175 W pump 12 for aspiration. For injection, the power consumption varies according to the volume of air to be injected. This did not exceed 35 W.

1.2 Remainder of the Installation

The tank 53 has a volumetric capacity of 1.5 $m^3$. The $CO_2$ and $O_2$ are supplied by pressurized cylinders. The buffer tank 54 has a volumetric capacity of about 100 L. It is drained by a bottom valve at the end of the experiment. This could easily be done automatically for continuous operation. To reoxygenate the water, part of the outlet flow from the column is circulated in the oxygenator 52 into which pure $O_2$ is injected.

2. Experiment 2.1 $CO_2$ Degassing Experiment 2.1.1 $CO_2$ Addition

To measure the effectiveness of the vacuum column in degassing the $CO_2$, a quantity of 25 $mg \cdot L^{-1}$ (+/−2 $mg \cdot L^{-1}$) of $CO_2$ at initial time ($T_0$ min) was fixed. To add $CO_2$ gas, a compressed $CO_2$ cylinder was used, disseminating the carbon dioxide through a microbubbler to facilitate the dissolution of the gas in the water of the tank 53. At the end of the experiment ($T_{60}$ min) the residual quantity of $CO_2$ was measured.

2.1.2 Experiments on the Vacuum Column with Variable Air Injection Depth

Ceramic microbubbles were placed in the central tube 3 of the vacuum column 1 at various depths (1, 2, 3 and 4 m), in order to measure the effect of air injection depth on the efficiency of the air-lift and of the $CO_2$ degassing.

2.1.3 Experiments of the Vacuum Column at Variable Water and Air Flow Rates

For a fixed air flow rate (0.5 $L \cdot s^{-1}$), the water flow rate was varied between 0.3 and 3 $L \cdot s^{-1}$ using a valve to measure its effect on the degassing efficiency. Similarly, for a fixed water flow rate (2 $L \cdot s^{-1}$), the injected air flow rate was varied between 0.03 and 0.55 $L \cdot s^{-1}$ using a valve.

2.2 Dimensioning of the Vacuum Column Pump Function

To evaluate the effectiveness of the pump function, the water flow rate was measured as a function of the total head (hmt) for various injected air flow rates (0.15, 0.3, 0.45 and 0.6 $L \cdot s^{-1}$). The hmt corresponds to the pressure to be supplied by the pump 112 to transfer a liquid from one place to another. To make it vary, the pressure drop was increased by altering the level of the water outlet in the tank 53 (0 to 40 cm).

2.3 Experiments on Heat Losses of the Vacuum Column

In order to estimate the heat loss for the vacuum column, a heating resistor was used to raise the water temperature by at least 5° C. above that of the air. The ambient temperature of the air was not monitored, and varied during the experiment. The temperature difference indicated therefore corresponds to that at the beginning of the experiment. The heat loss in W was calculated by considering the number of calories lost with respect to the water volume of the tank. It was validated by calculating the power consumed by the resistor to heat the same volume of water in a given time. However, the relative humidity was not taken into account.

2.4 Experiments on the Microparticle Extraction Efficiency

To estimate the microparticle extraction capacity of the vacuum column 1, an algal bloom was provided issuing from a lagunage pond, to fill ⅔ of the volume of the tank 53 with pond water. The vacuum column 1 was then operated while taking water samples from the tank at $T_0$, $T_{30}$ and $T_{60}$ min, and from the buffer tank 54 at $T_{60}$ min, in order to quantify the extraction of microalgae.

3. Measurement of Mechanical Parameters

3.1 Water Flow Rate

The water flow rates were measured by an Endress Hauser Promag W electronic flowmeter, whereof the measurement is given in $L \cdot min^{-1} \pm 10^3 \, L \cdot min^{-1}$.

3.2 Air Flow Rate

The air flow rates were measured by a Brook Tube Size R16-15-B ball flowmeter. The measurement is given in mm±1 mm. It was converted to $L \cdot s^{-1}$ using a reference curve.

4. Measurement of Chemical Parameters

4.1 Carbon Dioxide

A $CO_2$ probe (Oxyguard carbon dioxide analyzer) directly gives the value in $mg \cdot L^{-1}$ of $CO_2$ (to the nearest $mg \cdot L^{-1}$), by measuring the diathermancy of the gases in the water by infrared radiation. However, since the apparatus entails relatively lengthy operation, a reference curve of the $CO_2$ concentration as a function of pH in seawater was therefore plotted. This was used to determine the $CO_2$ values by monitoring the pH in the tank with a pH meter to the nearest $10^{-2}$ (Eutech instruments Ecospan pH 5). The values obtained with the pH meter at the start and end of the experiment were all validated with the $CO_2$ probe.

4.2 Oxygen

Oxygen was measured using an oxygen meter (YSI 52 Dissolved Oxygen Meter) which directly gives the value in $mg \cdot L^{-1}$ of $O_2$, and as a percentage of the $O_2$ saturation in the water. Its accuracy is $\pm 0.1 \, mg \cdot L^{-1}$ or $\pm 0.1\%$.

4.3 Other Parameters

The water temperature was monitored with the immersed thermometer of the pH meter to the nearest 0.1° C. Salinity was monitored with an ATAGO refractometer to the nearest ±1‰. To measure the total pressure of all the dissolved gases in the water (nitrogen, oxygen, $CO_2$, etc.), a saturometer (Alpha Design 300E Tensionometer) gave the value to the nearest mmHg.

5. Measurement of the Quantity of Microalgae Extracted

The microalgae concentration was not determined, but a measurement of the optical density (OD) using a spectrometer to the nearest $\pm 10^{-4}$ (Beckman DU 640 Spectrometer) provided an approximation of the microalgae extraction capacity.

6. Results

6.1 Characterization of the Operation of the Vacuum Column 1

6.1.1 Pump Function

The experiments served to characterize the capacity of the air-lift to entrain the water in the system. The water flow rates varied according to the quantity of air injected, the injection depth and the hmt. In fact, the more air injected, the higher the resulting water flow rate, and the deeper said air is injected, the higher the water flow rate, and finally, the higher the hmt, the lower the flow rate. During this experimental phase, we obtained maximum water flow rates of about $12 \, m^3 \cdot h^{-1}$, by the simple entrainment of the air-lift at $0.6 \, L \cdot s^{-1}$ of injected air.

6.1.2 Vacuum Column Degassing Function

The overall data concerning the experiments were used to plot the graphs. The inaccuracies and differences between the $CO_2$ measurement methods add to the standard deviations observed in the graphs concerning $CO_2$ degassing.

6.1.2.1 Effect of Injection Depth on $CO_2$ Extraction

Degassing is more effective when injection is carried out at greater depth, from 2 meters. However, there is no difference between injection at 2, 3 or 4 m.

6.1.2.2 Effect of Water Flow Rate on $CO_2$ Extraction

The water flow rate has an effect on the degassing efficiency. In fact, the higher the water flow rate, the more effective the degassing up to a plateau around $2 \, L \cdot s^{-1}$. The maximum degassing efficiency appears to occur when the water flow rate is about $2.5 \, L \cdot s^{-1}$ for $0.55 \, L \cdot s^{-1}$ of injected air, corresponding to a water/air ratio of about 5.

6.1.2.3 Effect of Air Flow Rate on $CO_2$ Extraction

The quantity of air injected clearly has an effect on the degassing action. As for the water flow rate, $CO_2$ extraction increases with the air flow rate, but its degassing efficiency decreases after reaching a plateau. The plateau reached around $0.4 \, L \cdot s^{-1}$ of injected air for $2 \, L \cdot s^{-1}$ of circulating water therefore corresponds to a water/air ratio of 5.

6.1.3 Skimmer Function of the Vacuum Column

The experiment demonstrated that over one hour of operation, the optical density of the water in the tank filled to ⅔ with water highly concentrated with microalgae decreased by half. The concentrate extracted by suction of the foam is 120 times more turbid than the water of the tank 53 at the end of the experiment.

7. Discussion

7.1 Pump Function of the Vacuum Column

Many studies have developed empirical and theoretical descriptions of the water entrainment for various air-lifts. However, the characteristics of the air-lifts depend on the specific configurations of each system, such as the air inlet conditions and the type of injector used. For the air-lift tested here, the quantity of water entrained logically increased with the air injection and the depth, and decreased with the total head.

However, it is important to observe that absolutely surprising water flow rates were obtained, up to six times higher than the injected air flow rate. These results are interesting and can be explained by the vacuum in the tested column.

7.2 Optimization of the Vacuum Column

7.2.1 Choice of Air Injection Depth

The experimental results show that the optimal air injection depth for effective degassing is located above 2 m. However, in order to obtain a substantial water flow rate simultaneously without using more energy, it is necessary to operate at greater injection depths to have a higher water flow rate. It is therefore proposed to inject the air into the column at 3 or 4 m depth. This would serve to obtain a water flow rate of more than $10 \, m^3 \cdot h^{-1}$, which could be used for other functions without having to pump the water.

7.2.2 Choice of Water Flow Rate

When operating with low water flow rates, the residence time in the column is long, and $CO_2$ degassing is higher, because the circulating water volume is reduced in relation to the air volume passing through and vice versa. However, if the objective, rather than instantaneous degassing, is to degas a volume in a given time, it has been shown that the best degassing occurs at a flow rate of about 2.5 $L \cdot s^{-1}$, when the air injection fixed is 0.55 $L \cdot s^{-1}$. Above this, the degassing efficiency no longer increases and even appears to decrease. In fact, at 2.5 $L \cdot s^{-1}$, the best compromise is obtained between the residence time of the water in the column and the renewal time of the tank water, for a water/air ratio of about 5.

7.2.3 Choice of Air Flow Rate

It has been shown that the more air is injected, the higher the degassing, up to a plateau when the air flow rate is 0.4 $L \cdot s^{-1}$, for a fixed water flow rate of 2 $L \cdot s^{-1}$. The degassing efficiency decreases with increasing air injection. The air flow rate of 0.4 $L \cdot s^{-1}$ for a fixed water flow rate is 2 $L \cdot s^{-1}$, because we showed previously that this was the best compromise between the residence time of the water in the column and the renewal time of the tank water for a similar ratio, that is, with an air flow rate of 0.5 $L \cdot s^{-1}$.

However, by varying the air flow rate, the power consumption is also varied. As it happens, operating with lower air flow rates serves to considerably increase the degassing energy efficiency. The $CO_2$ extraction per $kW \cdot h^{-1}$ is more efficient at very low air injections. This means that in theory, in order to substantially reduce the energy costs, it is better to operate with a low air flow rate, even if the $CO_2$ degassing is less effective, but sufficient for the safety of the living organism. However, operating with a low air flow rate does not enable the air-lift to supply water flow rates of 2.5 $L \cdot s^{-1}$.

Many alternatives are therefore available concerning the choice of the quantity of air to be injected, while having a sufficiently high water flow rate:

either a vacuum column is used by operating it with a water/air ratio of 5. The degassing efficiency is optimal, but costly in terms of energy;

or in order to save energy, two vacuum columns are used, operating with very low air injection (0.03 $L \cdot s^{-1}$), but serving to obtain a water flow rate of 2 $L \cdot s^{-1}$, by adding their water flow rates (0.96 $L \cdot s^{-1}$). The energy cost is about 30% lower than with a single vacuum column delivering a water flow rate of 2 $L \cdot s^{-1}$, despite its additional space and maintenance requirements.

A final alternative, probably more economical, would consist in modifying the geometry of the column. In fact, by increasing the cross section of the internal tube 3 of the column, the water flow rate is higher than that for the same air injection and hence for the same energy cost.

7.2.4 Skimmer Function

At the same time as it removes the $CO_2$ from the water, the vacuum column is capable of operating very effectively as a skimmer for the microparticles and particularly for the microalgae. After one hour, the column was capable of removing about half of the algae present in the tank. These results obtained are unexpected.

At present, in fact, it is estimated that 80% of the $O_2$ consumption of the biological filters is used for the degradation of the particulate carbon-containing material, and only 20% serves to treat the nitrogen-containing materials. By removing this particulate material, the biological filters would therefore chiefly serve to treat the nitrogen-containing material, so that not only could their size be reduced by 80%, but savings could also be realized in the addition of $O_2$ to the recycle circuit.

Furthermore, since the size of the parasite eggs (50 μm) is higher than that of the microalgae (2 μm), if the column can remove the microalgae, it can also remove the parasite eggs. This is highly advantageous in terms of biosafety, particularly to eliminate any form of parasitism in the breeding ponds.

The invention claimed is:

1. A method for treating an aqueous effluent comprising at least one dissolved gaseous compound comprising at least partially separating said compound from said effluent, in order to obtain a treated aqueous phase, depleted of said compound, a method according to which:

(a) an upflow liquid column of the aqueous effluent is established, by injecting and distributing into said column, at the bottom, a gas phase less rich in said compound than the aqueous effluent, said gas phase being distributed in said column in the form of bubbles whereof the volume increases upward, whereby a mixed liquid/gas stream is obtained at the top, (b) the mixed liquid/gas stream is separated into a liquid stream constituting the treated aqueous phase, and an offgas stream enriched with said gaseous compound, wherein the mixed liquid/gas stream is separated under vacuum by establishing a gas headspace between the liquid stream and the gas stream, and by aspirating the latter, the liquid stream separated from the offgas stream constitutes a downflow liquid column, obtained by overflow of the mixed liquid/gas stream above a high point, and the downflow liquid column and the upflow liquid column are concentric to one another.

2. The method as claimed in claim 1, wherein the upflow liquid column is internal and the downflow liquid column is external, or vice versa.

3. The method as claimed in claim 1, wherein the aqueous effluent is introduced at the bottom of the upflow column, and aqueous phase is tapped off at the bottom of the downflow liquid column substantially at the same level.

4. The method as claimed in claim 1, wherein oxygen is injected and distributed in the upflow liquid column at a higher level than the gas phase introduction level.

5. The method as claimed in claim 1, wherein the cross section of the downflow liquid column increases downward.

6. The method as claimed in claim 1, wherein ozone is injected and distributed in the downflow liquid column, at a lower level than the gas phase introduction level.

7. The method as claimed in claim 1, wherein the offgas stream in the form of foam is separated into a removed liquid exudate, comprising a particulate fraction, and an aspirated offgas.

8. A method for culturing a living organism in recirculated aqueous medium, whereby:

a bath of the aqueous medium is provided, in which the living organism is cultivated, an effluent stream, from which the aqueous effluent is obtained, is tapped off from the bath, and the bath is supplied with a feed stream, obtained from the treated aqueous phase, the treated aqueous phase being obtained outside the bath from the aqueous effluent, according to the method as claimed in claim 1.

9. The method as claimed in claim 8, wherein the level of withdrawal from the bath is substantially the same as that of the bottom of the upflow column.

10. The method as claimed in claim 8, wherein the feed level of the bath is above the bottom of a downflow column.

11. The aquaculture method as claimed in claim 8.

12. An installation for implementing the method as claimed in claim 1, comprising:

two concentric tubes, one external and the other internal, positioned vertically, arranging an internal tubular chamber for the upflow column or the downflow column, and an external tubular chamber for the downflow column or the upflow column; the external tube being closed in its upper part, above the upper end of the internal tube, means for introducing the aqueous effluent at the bottom of the internal chamber or the external chamber; means for removing the treated aqueous phase at the bottom of the external chamber or the internal chamber, means for injecting and distributing the gas phase in the upflow column, connected to a source of said pressurized gas phase, means for removing the offgas stream, connected to means for aspirating same.

13. The method claimed in claim 1, wherein the dissolved gaseous compound is carbon dioxide.

14. The method claimed in claim 1, wherein the gas phase less rich in said compound is air or oxygen.

* * * * *